(12) United States Patent
Parker et al.

(10) Patent No.: US 11,153,009 B1
(45) Date of Patent: Oct. 19, 2021

(54) HIGH-LANE COUNT OPTICAL TRANSCEIVER WITH BUILT-IN SELF TEST

(71) Applicant: Juniper Networks, Inc., Sunnyvale, CA (US)

(72) Inventors: John Parker, Goleta, CA (US); John Garcia, Santa Barbara, CA (US); Brandon Gomez, Goleta, CA (US); Molly Piels, Santa Barbara, CA (US); Anand Ramaswamy, Pasadena, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/934,525

(22) Filed: Jul. 21, 2020

(51) Int. Cl.
*H04B 10/079* (2013.01)
*H04B 10/40* (2013.01)

(52) U.S. Cl.
CPC ... *H04B 10/07955* (2013.01); *H04B 10/0799* (2013.01); *H04B 10/07957* (2013.01); *H04B 10/40* (2013.01)

(58) Field of Classification Search
None
See application file for complete search history.

(56) References Cited

U.S. PATENT DOCUMENTS

| 9,178,610 B1 | 11/2015 | Chan et al. | |
| 9,584,884 B1 | 2/2017 | Nagarajan | |
| 10,637,584 B1 | 4/2020 | Palmer et al. | |
| 2012/0163825 A1* | 6/2012 | Wu | G02B 6/29313 398/85 |
| 2015/0222968 A1* | 8/2015 | Garcia | H04B 10/40 398/48 |

OTHER PUBLICATIONS

"European Application Serial No. 20201525.1, Extended European Search Report dated Apr. 13, 2021", 5 pgs.

* cited by examiner

*Primary Examiner* — David W Lambert
(74) *Attorney, Agent, or Firm* — Schwegman Lundberg & Woessner, P.A.

(57) ABSTRACT

An optical device such as an optical transceiver can include a cascaded built-in self-test structure that can be configured in testing mode using an active power mode and can sufficiently attenuate light away from a loopback path in an inactive power mode. The optical device can include a wafer top emitter that can be used to tune a light source for testing and calibration of optical components while the built-in self-test structure is in active mode.

20 Claims, 9 Drawing Sheets

HIGH-LANE COUNT OPTICAL TRANSCEIVER WITH BUILT-IN SELF TEST

TECHNICAL FIELD

The present disclosure generally relates to optical devices, and more particularly to testing optical-electrical devices.

BACKGROUND

Modern high-speed integrated circuits (ICs) have complex architectures, with millions of components such as transistors that must operate in concert to transmit data at multi-gigabit data rates required by modern communication networks. One of the critical steps of manufacturing such devices is the testing and calibration of the high-speed devices to ensure the devices do not fail at a later point in time, e.g., after integration into a product. Current testing systems are generally configured for electronic or semiconductor devices are not configured to provide rapid testing and calibration of some modern hybrid high-speed devices, such as optical transceivers that process both electricity and light to achieve higher data rates.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, or characteristic included in at least one implementation of the inventive subject matter. Thus, phrases such as "in one embodiment" or "in an alternate embodiment" appearing herein describe various embodiments and implementations of the inventive subject matter, and do not necessarily all refer to the same embodiment. However, they are also not necessarily mutually exclusive. To easily identify the discussion of any particular element or act, the most significant digit or digits in a reference number refer to the figure ("FIG.") number in which that element or act is first introduced.

Descriptions of certain details and implementations follow, including a description of the figures, which may depict some or all of the embodiments described below, as well as discussing other potential embodiments or implementations of the inventive concepts presented herein. An overview of embodiments of the disclosure is provided below, followed by a more detailed description with reference to the drawings.

DETAILED DESCRIPTION

In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, structures, and techniques are not necessarily shown in detail.

As discussed, modern high-speed network devices, such as optical transceivers, can be difficult to test using conventional testing apparatus. To this end, a built-in self-test optical structure can be integrated into an optical-electrical device that enables wafer-level testing at manufacturing stage and further enables later testing and calibration after the device is singulated from the wafer and integrated into an end product. In some example embodiments, the optical device includes an optical transmitter and receiver to send and receive one or more lanes of optical data from devices (e.g., over external optical network). The transmitter and the receiver can be connected via an integrated loopback path that can be enabled for loopback testing and disabled for mission mode (e.g., mission mode or transceiver mode in which the device transmits and/or receives light with optical devices, such as an optical network). The optical device can include a switch comprising a sequence of cascaded filters that increasingly attenuate by directing light away from the loopback path to a drop port (e.g., coupled to an optical absorber or unguided mode). In some example embodiments, each of the filters comprises a power splitter that is configured to passively direct light received by the filter away from the loopback path (e.g., towards the drop ports). Each of the filters can include a tuner that can modify the light in the filter to direct it towards the optical loopback path thereby enabling loopback-based testing during manufacturing and after operation in the field (e.g., in an end product). In some example embodiments, one or more of the filters on the loopback path are utilized for accurately setting the laser wavelength of at initialization of the optical device (e.g., optical transceiver).

In some example embodiments, the transceiver is a multilane optical device that transmits different lanes of data on different channels over separate fibers (e.g., parallel single mode). As the number of lanes increases, each lane can include an integrated switch that can operate in a low- or zero-power mode that directs light away from the waveguide and can be configured to an active mode via providing power to the tuners in each filter. In this way, the number of lanes of an optical transceiver design can be increased without requiring active controls or switches to direct light away from the respective loopback paths of the lanes.

In some example embodiments, the integrated loopback switch includes a wafer top emitter (e.g., grating) that can output light from the lane to enable wafer-level testing and calibration during the manufacturing stage. For example, a laser can generate light and can be tuned by outputting light from the wafer top emitter to an optical testing device, such as wavelength meter or optical spectrum analyzer. In some example embodiments, the laser for a given lane is tuned to a certain wavelength, followed by activation of the tuners in the loopback switch to enable accurate built-in self-testing of the optical device in an approach that can be scaled to high quantities of optical lanes.

Figure 1A:
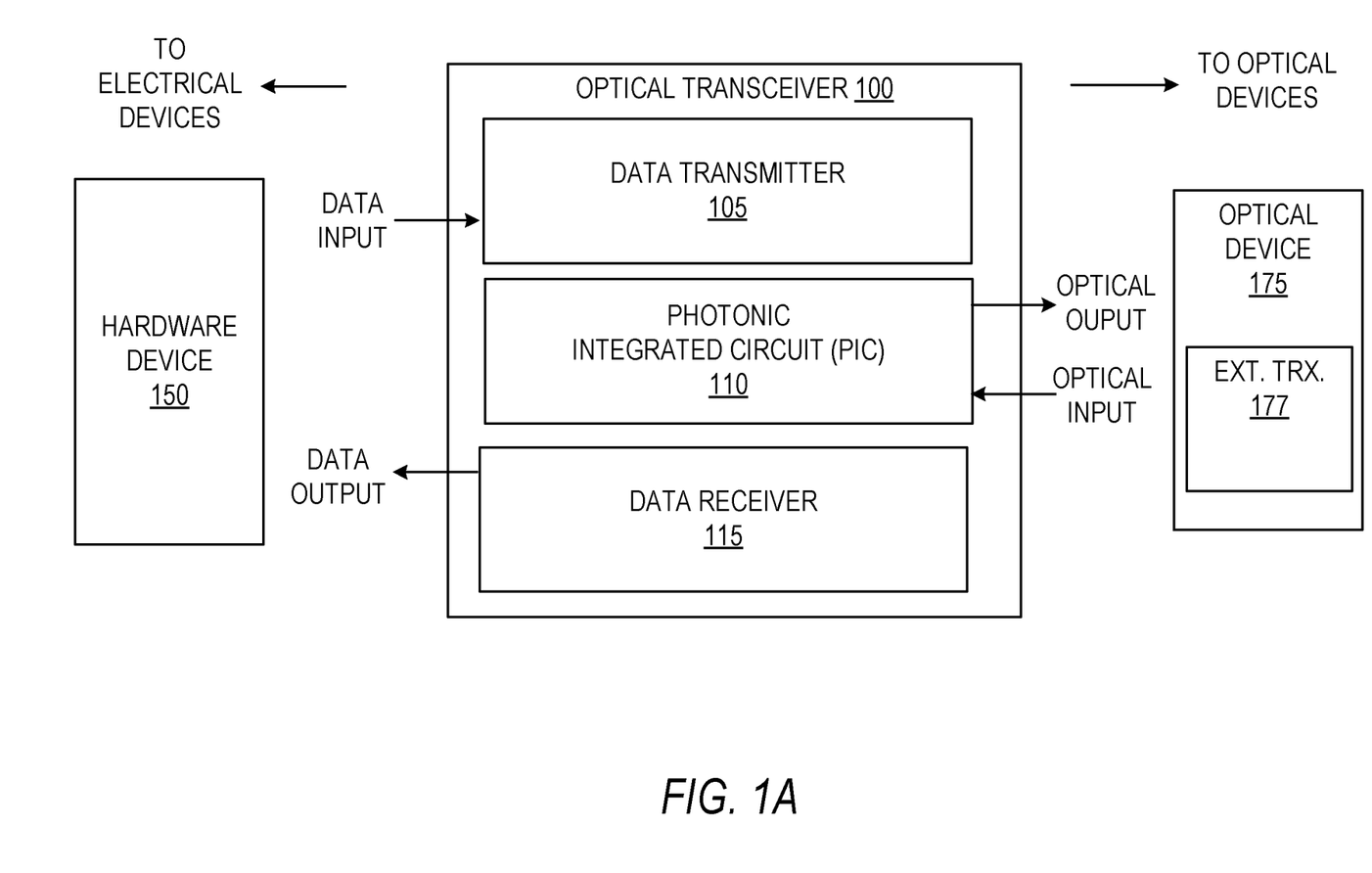
FIG. 1A is a block diagram illustrating an optical transceiver for transmitting and receiving optical signals, according to some example embodiments.

FIG. 1A is a block diagram illustrating an optical transceiver 100 for transmitting and receiving optical signals, according to some example embodiments. The optical transceiver 100 is an example high-lane count optical transceiver in which an efficient built-in self-test loopback path can be implemented. The optical transceiver 100 is configured to interface electrical data from electrical devices, such as electrical hardware device 150, convert the electrical data into optical data, and send and receive the optical data with one or more optical devices, such as optical device 175. For explanatory purposes, in the following description the electrical hardware device 150 is a host board that "hosts" the optical transceiver 100 as a pluggable device that sends and receives data to an optical switch network; where, for example, optical device 175 can be other components of an optical switch network (e.g., external transmitter 177). However, it is appreciated that the optical transceiver 100 can be implemented to interface with other types of electrical devices and optical devices. For instance, the optical transceiver 100 can be implemented as a single chip on a hybrid "motherboard" that uses an optical network (e.g., waveguides, fibers) as an optical bus to interconnect on-board electrical chips that process the data after it is converted from light into binary electrical data, according to some example embodiments.

In some example embodiments, the hardware device 150 includes an electrical interface for receiving and mating with an electrical interface of the optical transceiver 100. The optical transceiver 100 may be a removable front-end module that may be physically received by and removed from hardware device 150 operating as a backend module within a communication system or device.

The data transmitter 105 of the optical transceiver 100 can receive the electrical signals, which are then converted into optical signals via PIC 110. The PIC 110 can then output the optical signals via optical links, such as fiber or waveguides that interface with the PIC 110. The output light data can then be processed by other components (e.g., switches, endpoint servers, other embedded chips of on a single embedded system), via a network such as a wide area network (WAN), optical switch network, optical waveguide network in an embedded system, and others. Although a single data transmitter 105 is illustrated, it is appreciated that additional data transmitters are included as part of the design of optical transceiver 100 (e.g., four individual data transmitters, one for each lane of a PSM4 system as discussed below).

In receiver mode, the optical transceiver 100 can receive high data rate optical signals via one or more optical links to optical device 175. The optical signals are converted by the PIC 110 from light into electrical signals for further processing by data receiver 115, such as demodulating the data into a lower data rate for output to other devices, such as the electrical hardware device 150. Although a single data receiver 115 is illustrated, it is appreciated that additional data receivers are included as part of the design of optical transceiver 100 (e.g., four individual data receivers, one for each lane of a PSM4 system as discussed below).

The optical transceiver 100 and the hardware device 150, for example, can be components of an optical communication device or system (e.g., a network device) such as a wavelength-division multiplexing (WDM) system or parallel single mode (PSM) system. Generally, WDM systems transmit multiple streams of data on different wavelengths (e.g., on different carrier wavelengths) over an individual fiber. In WDM embodiments, an individual fiber outputs, from the PIC 110, multiple lanes, where each lane corresponds to a channel (range) of wavelengths. For example, in FIG. 1A the optical transceiver 100 is coupled to the optical device 175 via single mode fiber which can include four different WDM lanes of light having different wavelengths which do not mix due to each lane being at a different wavelength. Further, the optical transceiver 100 receives WDM light from a single mode fiber that receives four different WDM lanes of light for separation and processing (e.g., conversion from optical to electrical data, filtering, and output to one or more hardware devices, such as hardware device 150).

Figure 1B:
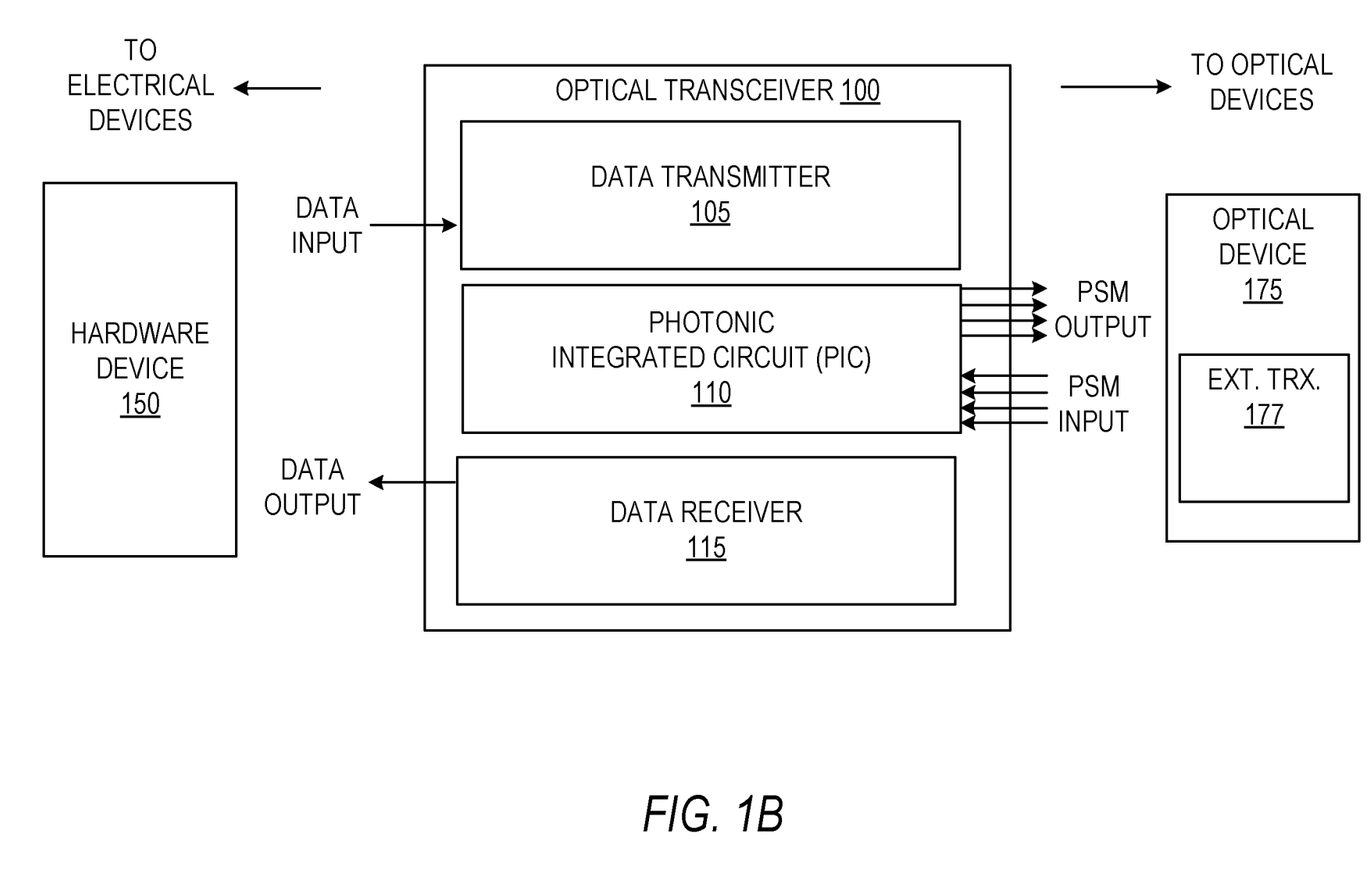
FIG. 1B is a block diagram illustrating a parallel lane optical transceiver for transmitting and receiving optical signals, according to some example embodiments.

In parallel single mode, each lane is split onto different light paths or fibers that keep each lane separate. For example, with reference to FIG. 1B, the optical transceiver 100 is a PSM4 transceiver with four different lanes. In some example embodiments, a single laser generates light at the carrier wavelength, which is split and modulated by four different receivers for each lane. The four modulated beams are then output from the optical transceiver on four transmit optical fibers. Similarly, four PSM receive fibers are coupled to the optical transceiver 100, where each receive fiber carries an individual lane of optical data and the lanes on each fiber use the same carrier wavelength. Additional PSM lanes can be implemented by designing the PIC 110 with additional modulation paths. For example, the optical transceiver 100 can be designed as a 64 lane PSM optical transceiver, where one light source generates carriers for 64 different optical modulators. Each of the 64 modulators impart data by modulating the light using data from the data transmitter 105 (e.g., a data transmitter having 64 modulator drivers, one for reach lane). The 64 lanes of light are then output on 64 different fibers grouped together as output fibers (e.g., to be routed to 64 different remote receivers or devices). Similarly, 64 input lanes of PSM light can input light into the optical transceiver 100 via 64 input fibers, which can then be processed and output to one or more hardware devices such as an Ethernet switch for further routing.

Figure 2:
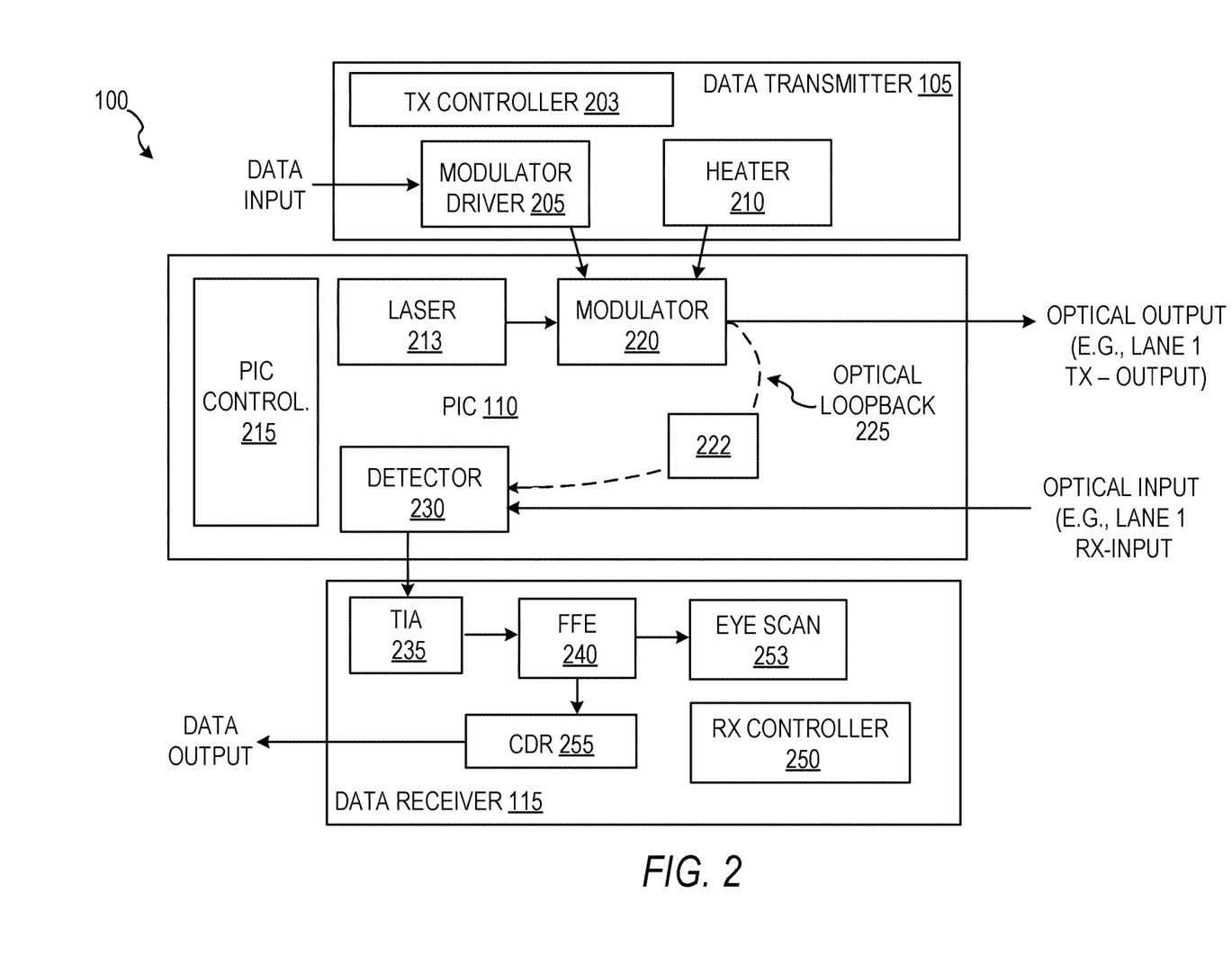
FIG. 2 shows example functional components of the optical transceiver having a loopback mode, according to some example embodiments.

FIG. 2 shows example functional components of the optical transceiver 100 having a loopback mode, according to some example embodiments. As discussed, the transceiver 100 can be implemented as a WDM or PSM system, where only a single lane is illustrated in FIG. 2 for brevity. Additional lanes having additional loopback paths can be included in the optical transceiver design, where each loopback structure may be repeated N times to enable efficient high-lane counts, e.g., 64 lanes.

In the example of FIG. 2, the data transmitter 105 manages receiving electrical data and controlling components of the PIC 110 using instructions stored in the transmitter (TX) controller 203. Examples of TX controller 203 include, but are not limited to, a digital signal processing (DSP) unit, a general purpose microprocessor, an ASIC, a field programmable gate array (FPGA), a combination thereof, or other equivalent integrated or discrete logic circuitry with accompanying memory to store control instructions for execution.

In some example embodiments, the data transmitter 105 receives electrical data input from an external device, such as an external host device or host board. The transmitter controller 203 can then execute instructions that convert the electrical data into optical modulation data that the modulator driver 205 uses to control an optical modulator 220 (e.g., phase shifter, electro-absorption modulator (EAM), Mach-Zehnder Interferometer (MZI) modulator) in the PIC 110. The modulator 220 receives light from a light source such as laser 213, which then modulates the received light according to the modulation instructions (e.g., converting binary electrical data to PAM4 modulation or QPSK modulation symbol data), which is then output from the PIC 110 as output light (e.g., output light that is transmitted over an optical switch network). In some example embodiments, to compensate for environmental or device temperatures, which may affect the modulation characteristics of the optical modulator 220, the transmitter controller 203 controls a heater 210 to dynamically keep the modulator 220 at a desired operating range. Although the example of FIG. 2 illustrates a simplified version of transmitter 105 with various components not included for brevity, it is appreciated that the transmitter 105 can include additional various components, further discussed below, and in accordance with some example embodiments.

The PIC 110 can receive optical input light (e.g., from a single mode fiber) that is detected by optical detector 230, which can use an optical element, such as a photodiode and/or other elements, to detect the photons in the received light and convert the light into electricity for demodulation processing by the data receiver 115, as discussed in further detail below.

In some example embodiments, the PIC 110 includes an optical loopback path 225 (e.g., integrated waveguide) that directs the output light immediately from the transmitting components (e.g., transmitter optical subassembly comprising modulator 220 and data transmitter 105) to the receiving components (e.g., detector 230, data receiver 115) to analyze and calibrate the transceiver 100 during design, testing, and manufacturing stages, as well as in the field (e.g., as part of a built-in self-test (BIST) procedure after integration into an end product).

The loopback path 225 allows for on-chip or intra-module characterization of the optical transceiver 100, including, but not limited to, tests such as bit error rate (BER) characterization, received power and sensitivity characterization, and calibration of filters (e.g., multiplexer, de-multiplexer, etc.) present in the transceiver 100.

In some example embodiments, the PIC 110 includes a high-lane count BIST optical switch architecture 222 that can receive a control signal to direct the output of a transmitting component (e.g., modulator 220) towards the receiving components (e.g., detector 230). In some example embodiments, the loopback path 225 switching elements may comprise (but are not limited to) all or a subset of the following optical components: a SOA, a thermo-optic switch, a p-i-n diode switch, or a switch network composed of one or more multimode interference (MMI) couplers and Mach Zehnder interferometers (MZIs). The addition of the switching element allows for the imposition of an electrical control signal to determine the routing of the optical signal from the transmitter. For a particular control condition, the switch could enable within PIC (or module) routing of the optical signal from the transmitter to the receiver as part of a built-in test mode.

For a different control condition, the same switching element could ensure that the optical signal is routed from the transmitter to the external optical link. In some example embodiments, the PIC includes a further switch architecture 222 that receives a control signal to receive light on the loopback path 225 from the receiving components (e.g., modulator 220, switch architecture 222). In this way, the optical transceiver 100 eliminates the need for an external optical link to the module to form an optical link between the transmit and receive paths of a transceiver, thereby eliminating external coupling calibration operations, coupling loss, external fiber-to-switch connections, and so forth. Furthermore, calibration and functional verification of the individual transmit and receive sections of a transceiver are not limited to solutions that require a physical optical connection to be made external to the unit. Moreover, when the transceiver needs to be set to "normal" operation mode, no external connection between the transmitter and receiver need be disconnected because the integrated loopback path may simply be disabled.

Although the example of FIG. 2 illustrates a simplified version of PIC 110 with various components not included for brevity, it is appreciated that the PIC 110 can include additional various components for sending and receiving light (e.g., MZIs, electro-absorption modulation (EAMs), multiplexers, demultiplexers, filters).

The data receiver 115 manages receiving electrical data from the PIC 110 and processing the electrical data (e.g., amplifying filtering, demodulating) by controlling components of the receiver 115 using instructions executed and/or stored in the receiver (RX) controller 250. Examples of RX controller 250 include, but are not limited to, a DSP unit, a general purpose microprocessor, an ASIC, an FPGA, a combination thereof, or other equivalent integrated or discrete logic circuitry with accompanying memory to store control instructions for execution.

The electricity (e.g., electrical signal, electrical current) generated by the detector 230 can be converted into an amplified electrical voltage by the TIA 235, which is then processed by a feed forward equalizer (FFE) 240. The FFE 240 implements one or more delays to create and combine a delayed version of the signals to filter and enhance the signal. In some example embodiments, the FFE 240 inputs the filtered electrical signal into a receiver eye scan analyzer 253 that can be implemented by the RX controller 250 to analyze the received signal (e.g., by generating one or more eye diagrams). Further, and in accordance with some example embodiments, the filtered signal is then processed by a clock and data recovery (CDR) module 255 to process and recover timing/clock characteristics of the data (e.g., extract the clock signal and retime the data signal), which is then further processed or is output as data (e.g., for further processing by an external device, such as hardware device 150).

Figure 3:
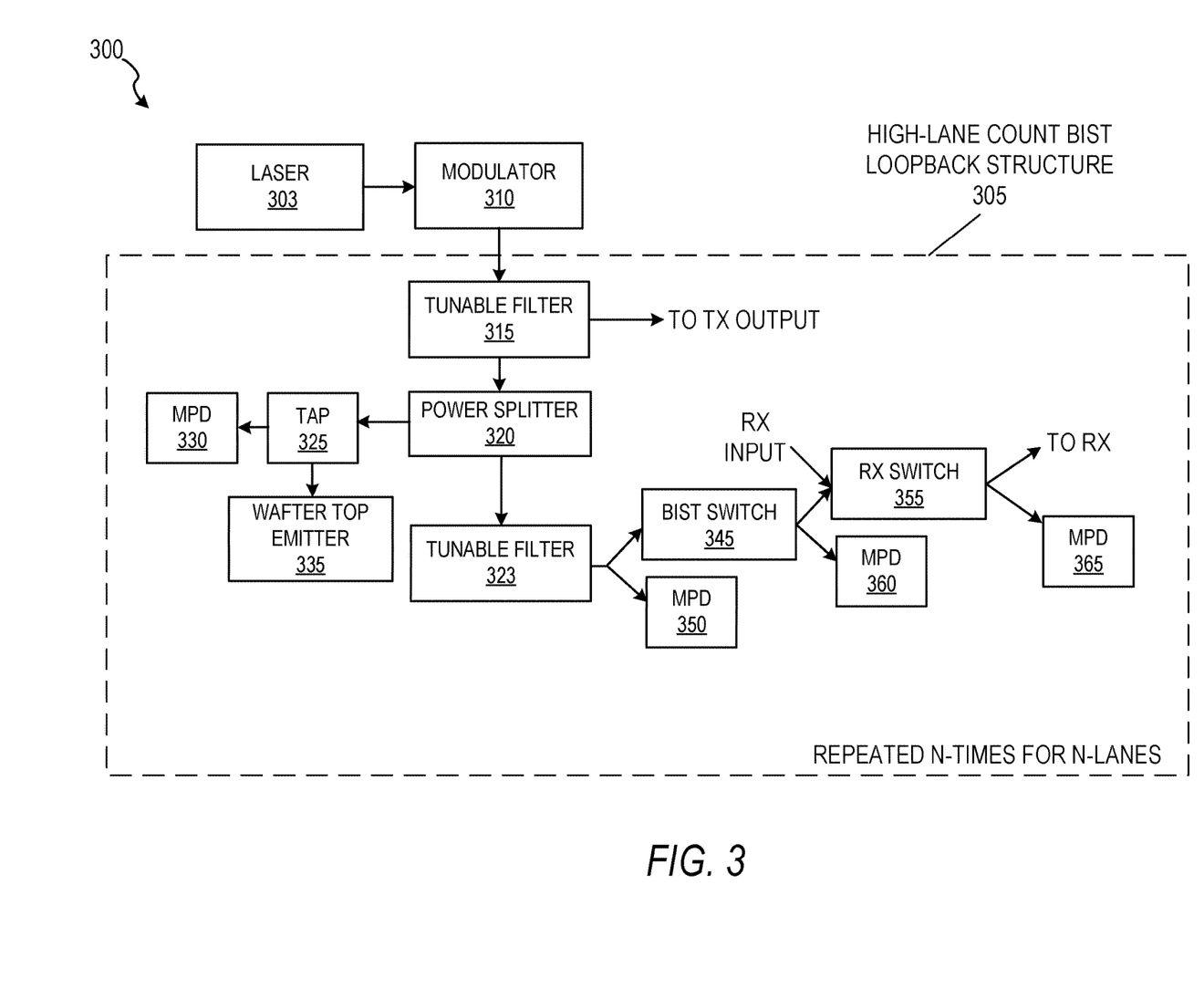
FIG. 3 shows a built-in self-test architecture according to some example embodiments.

FIG. 3 shows a built-in self-test switch architecture 300, according to some example embodiments. The high-lane count BIST loopback structure 305 is an example configuration of the optical switch architecture 222 of FIG. 2, according to some example embodiments. The laser 303 (e.g., laser 213, FIG. 2) can be configured as an internal or external laser for a WDM transceiver (FIG. 1A) or a PSM transceiver (FIG. 1B), and the loopback structure 305 can be implemented multiple times for each additional modulation path. For example, the structure 305 can be implemented one time in a PIC design for a single WDM transceiver design in which four lanes are looped from the transmitter to the receiver using a single instance of the loopback structure 305. Alternatively, the transceiver can include a high number of lanes, such as a 64 lane PSM transceiver, and the 64 instances of the loopback structure 305 can be configured to provide BIST loopback functionality between 64 transmitters to 64 corresponding receivers of the respective 64 PSM lanes. One benefit of the structure 305 is that it consumes BIST switch power when in BIST mode, and when not in BIST mode (e.g., when the optical transceiver is in mission mode) each loopback structure can strongly attenuate the loopback paths while using an efficient zero-power switch configuration. Additionally, in BIST enabled mode, the loopback loss is less than mission mode usage or external optical fiber based loopback, and in the BIST disable mode, the loopback loss is sufficiently high as to have no impact on receiver performance (e.g. <0.1 dB power penalty due to optical cross-talk from Tx to Rx).

The laser 303 can be a tunable laser that generates carrier light, which is then modulated by an optical modulator 310 (e.g., modulator 220, FIG. 2). The optical modulator 310 then inputs the carrier light into the tunable filter 315 which is then output as the transmitter output (e.g., for transmission to an optical device 175, as in FIG. 1A or FIG. 1B). The tunable filter 315 can provide a reference wavelength for the photonic integrated circuit. In some example embodiments, the loopback structure 305 includes multiple tunable filters, each of which has a different free spectral range. The multiple tunable filters can operate in concert to provide a unique combined transmission peak for a desired output wavelength. In some example embodiments, a power sense circuit is embedded in each tunable filter to provide a repeatable position for the given filter as the resistance of the tunable filter changes over time.

The tunable filter 315 is coupled to a power splitter 320 (e.g., directional coupler, multi-mode interference (MMI) coupler), which couples the received light to a wave top emitter 335 and monitor photodiode (MPD) 330 via tap 325. The power splitter 320 further inputs light to another tunable filter 323 which is coupled to a BIST switch 345 and a monitor photodiode (MPD) 350.

In some example embodiments, during manufacturing time, the optical transceiver can be tested at the wafer level using the wafer top emitter 335. In some example embodiments, the wafer top emitter 335 is formed as an etched grating in silicon nitride or silicon. In some example embodiments, in which the wafer top emitter 335 is a silicon nitride grating, a taper is used to transition the optical mode from a silicon waveguide to a silicon nitride waveguide before being input into the silicon nitride grating embodiment of wafer top emitter 335.

One optical test and calibration procedure that can implement wafer-level testing using the wafer top emitter 335 for the given lane includes laser wavelength measurement for the lane. As many optical wafer scale measurements are based on the laser, it is highly beneficial to set the tunable laser to the desired wavelength using an external optical spectrum analyzer (OSA) coupled to the wafer top emitter 335 to adjust the wavelength. As an example, the laser 303 can be tuned until an external OSA coupled to the wafer top emitter 335 displays a value of 1300 nm; after which point additional measurements can be performed in the BIST-enabled mode. For instance, and in accordance with some example embodiments, if the transmit power on the last MPD on the transmit chain (e.g., MPD 365) is above a pre-set minimum and the receiver responsivity in BIST loopback mode is above a pre-set minimum, then the optical transceiver (or specific lane of the transceiver) is considered calibrated and functioning. Due to the transmit power and receiver responsivity varying strongly according to different laser wavelengths, the setting of the laser 303 to a target test wavelength via the emitter 335 can ensure accurate testing of the device.

Further, an external optical spectrum analyzer can also be used to measure the quality of the laser 303 by identifying any unexpected deviations in the laser tuning performance.

For example, if the laser 303 cannot reach 1300 nm and can only reach 1298 nm, then the transceiver device can be considered faulty due to a bad laser, whereas if the laser 303 reaches 1300 nm, but jumps rapidly from 1290 nm to 1300 nm, the laser 303 might be failed for tuning instability.

In some example embodiments, for high throughput testing, an external optical spectrum analyzer is not implemented to control the laser 303 directly as this incurs additional testing time, but rather the laser 303 will be set to predefined calibration settings that are near the target laser wavelength. Additionally, and in accordance with some example embodiments, one or more MZIs and MPDs are implemented to target the wavelength of the laser 303. In these example embodiments, an external optical spectrum analyzer can still be implemented to record the laser wavelength, and if the wavelength is far from the target, then the optical transceiver will be binned as a fail. Notably, this approach is more efficient than controlling the laser via the OSA as it requires only one wavelength readout from the optical spectrum analyzer, rather than multiple readouts to align the laser with the control loop using emitter 335.

Additional valuable testing parameters can be measured using the wafer top emitter 335 including laser side-mode-suppression ratio (SMSR) using the optical spectrum analyzer, laser relative intensity noise (RIN) using an external photodiode and electrical spectrum analyzer, and laser optical linewidth using an external optical delay line interferometer with a photodiode and electrical spectrum analyzer, according to some example embodiments.

The power splitter 320 further couples light into the BIST switch 345, which is further detailed below with reference to FIGS. 4 and 5. The BIST switch 345 is coupled to a receiver switch 355, which can be activated to loop light from the receiver to the modulator in loopback mode. The BIST switch 345 is configured to have a high attenuation that stops the light from being coupled into the receiver switch 355 during mission mode (e.g., during transmission to external/remote devices, such as optical device 175) without using power for each filter in the BIST switch 345. Additionally, monitor photodiode (MPD) 360 can monitor the output of the BIST switch 345, and monitor photodiode 365 monitors the output of the receiver switch 355 during mission and loopback mode and can be used to test optical components, such as the laser 303, as discussed above.

In some example embodiments, to switch from mission mode to loopback mode, the receiver switch 355 reconfigures an active tuner to couple the output of the BIST switch 345 to the receiver path (e.g., loopback path 225, FIG. 2). Further, the BIST switch 345 activates one or more tuners to direct light from the power splitter 320 to the receiver switch 355, thereby coupling the light to the optical receiver.

Figure 4:
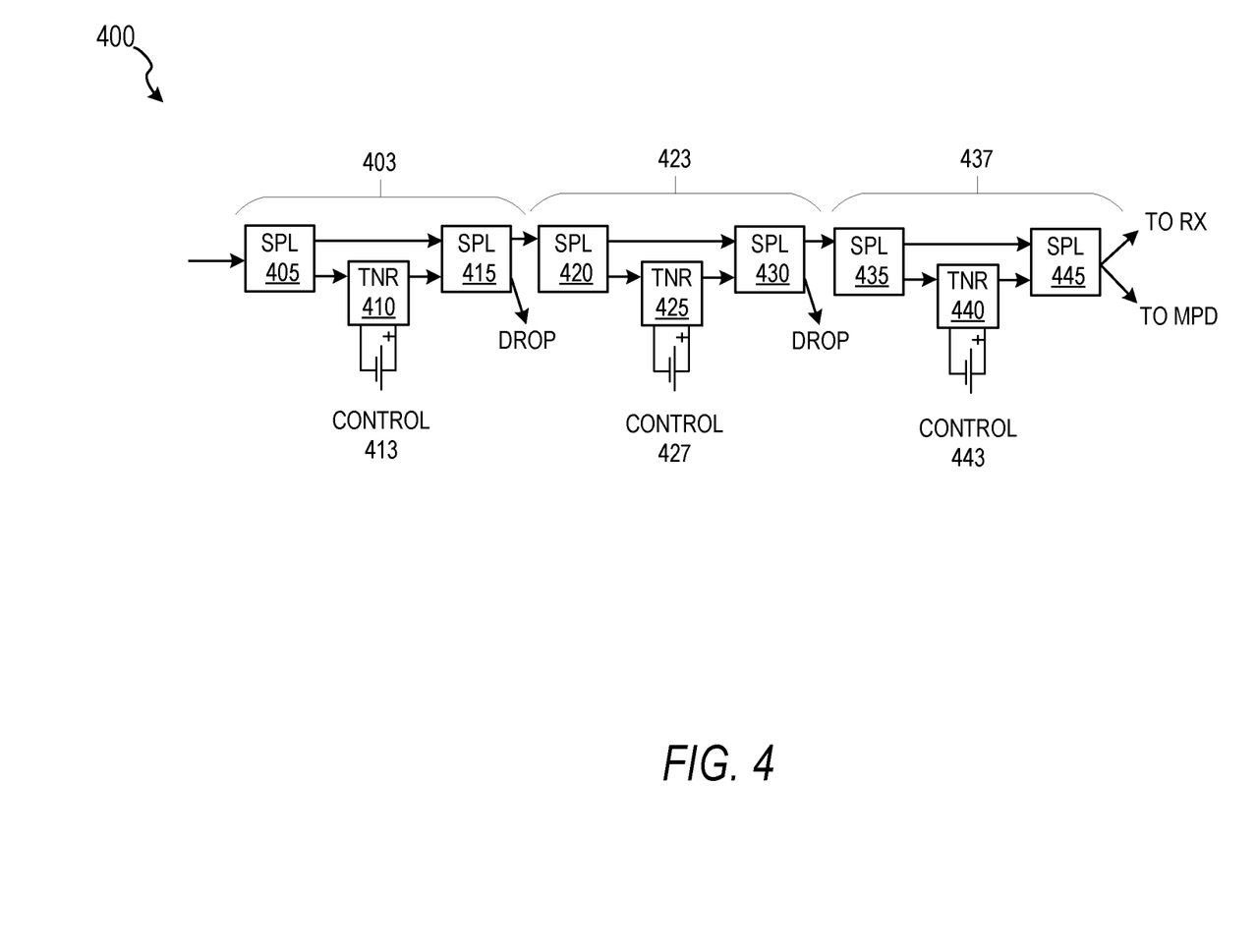
FIG. 4 shows an example switch architecture for a built-in self-test switch, according to some example embodiments.

FIG. 4 shows an example switch architecture 400 for a BIST switch, according to some example embodiments. The architecture 400 includes multiple cascaded passive switches or filters including BIST filter 403, BIST filter 423, and BIST filter 437. As discussed here, each BIST filter comprises an input coupler (e.g., 2×2 splitter 405, 2×2 splitter 420, 2×2 splitter 435) and an output coupler (e.g., 2×2 splitter 415, 2×2 splitter 430, and 2×2 splitter 445) which are connected by two optical paths or waveguides, where one of the paths connecting the input and output couplers has a tuner that operates in zero power in BIST-disabled mode and is controlled electrically to pass light in BIST mode for testing and calibration. In some example embodiments, splitter 405 is a 2×2 switch (splitter) to provide a zero-bias off-state with only one port being utilized (as implementing a 1×2 switch as splitter 405 would result in a pi/2 power setting to turn the switch off).

In the example illustrated, the BIST filter 403 includes an optical power splitter 405, which is coupled to an optical tuner 410 and an optical splitter 415 with a transmit port that transmits to the next filter (e.g., filter 423) and a drop port that discards light coupled to that port (e.g., couples the light to the drop port to an optical absorber or an unguided mode). The BIST filter 423 includes an optical power splitter 420, which is coupled to an optical tuner 425 and an optical splitter 430 with a transmit port that transmits to the next filter (e.g., filter 437), and the drop port that discards light coupled to that port (e.g., couples the light at the drop port to an optical absorber, such as an SOA). The BIST filter 437 includes an optical power splitter 435, which is coupled to an optical tuner 440 and an optical splitter 445 with a transmit port that transmits out of the switch architecture 400, and another output port which couples light to a monitor photodiode. In some example embodiments additional BIST stages are included, for example the BIST filter 437 can output to an additional filter (not depicted) to provide higher attenuation during a zero-power BIST mode, according to some example embodiments.

In some example embodiments, each of the BIST switches includes a tuner which is controlled electrically by a control circuit: tuner 410 is controlled electrically by control 413, tuner 425 is controlled electrically by control 427, and tuner 440 is controlled electrically by control 443. Each of the tuners can be implemented as an electrically controlled optical phase tuner, such as a resistive heater placed close to the waveguide that modifies the optical phase via a thermo-optical effect. Alternatively, in some example embodiments, each tuner is a diode formed in the waveguide region that modifies the optical phase of propagating light via an electro-optic effect, such as a change in the optical absorption or refractive index of the active material.

The splitters 405, 415, 420, 430, 435, and 445 can be fabricated as power splitting couplers, such as a multimode interference (MMI) or direct coupler having a preconfigured power splitting ratio set according to coupled mode theory as is known by those of ordinary skill in the art. For example, the splitters 405, 420, and 435 can be configured as 50/50 splitters that couple half an amount of received light into each output port (e.g., each of which goes to a tuner or an output coupler of the given filter). In BIST disabled mode, each filter contains a set of MZI paths that combine out of phase and deconstructive interface occurs to passively stop the light from being directed along the loopback path, according to some example embodiments.

For example, while in the BIST-disabled mode, the splitter 430 receives the light from the top arm (from splitter 420) and the bottom arm (via tuner 425), and deconstructive interference occurs in splitter 430, thereby attenuating light at the filter 423 (e.g., attenuating by deconstructive interference.

In the BIST-enabled mode, the filters 403, 423, 437 are provided power to enable light to pass through each filter (e.g., in which not full deconstructive interference occurs at the output splitter of each filter). For example, with reference to filter 423, the tuner 425 receives power to cause a phase change in the light on the lower arm, which is then coupled in the splitter 430 which passes light to the next filter 437 via the top port of splitter 430.

In this way, the cascaded filters 403, 423, 437 function as a passive switch to replace a single actively controlled switch for the loopback path. The optical architecture provides a higher switch attenuation by cascading multiple stages without the need for fine active control. In some example embodiments, the switches are aligned for maximum attenuation at zero power such that the switch power is only required during the BIST mode, during loopback mode for calibration and testing (e.g., calibrating the modulator of the transmitter for the lane, calibrating heater bias, the light source, etc.).

Figure 5:
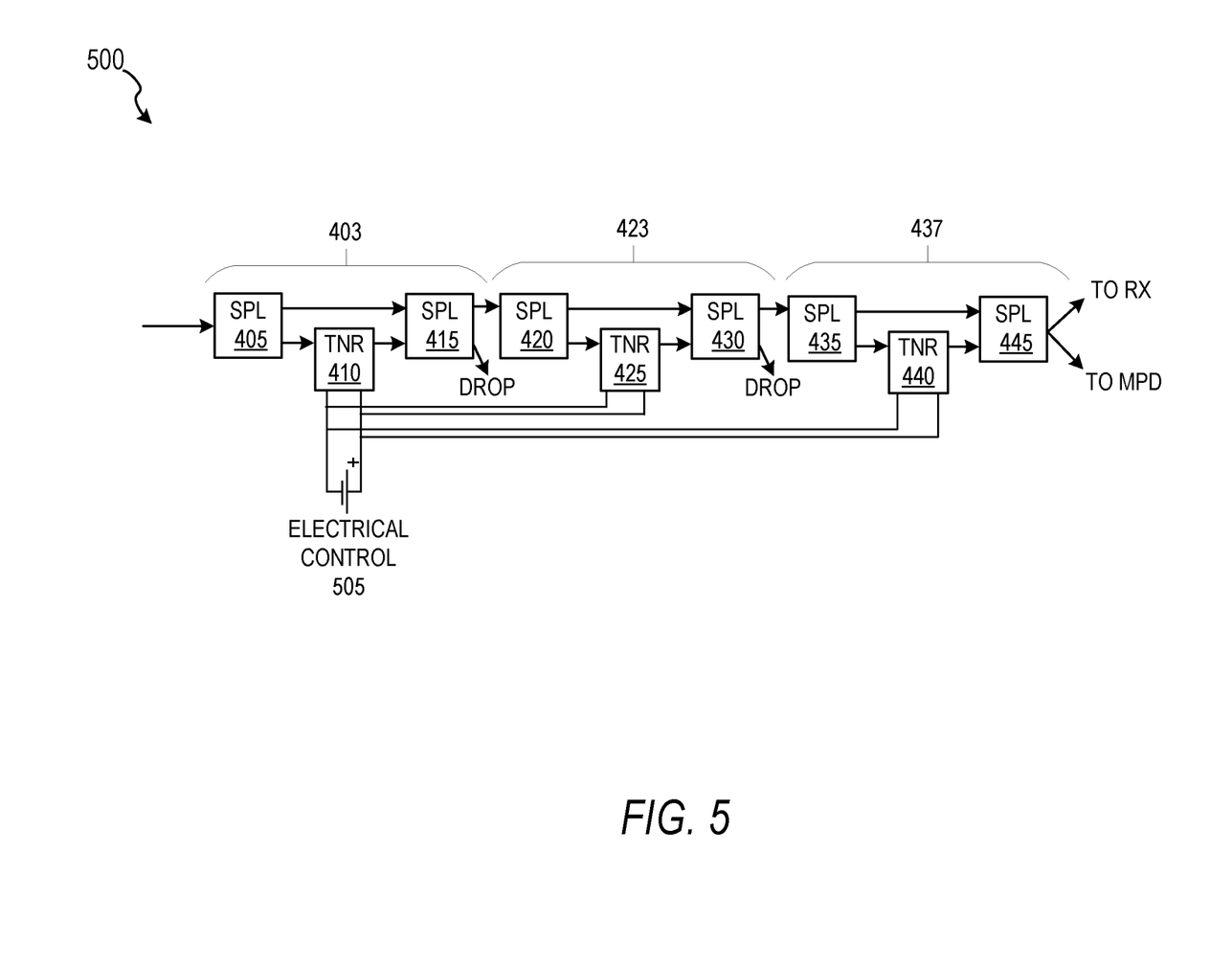
FIG. 5 shows an example switch architecture for a built-in self-test switch, according to some example embodiments.

FIG. 5 shows an example switch architecture 500 for a BIST switch, according to some example embodiments. In the example of FIG. 5, each of the tuners 410, 425, and 440 is electrically controlled by a single electrical control circuit 505. In the tuning process, the electrical control circuit 505 simultaneously tunes each of the tuners 410, 425, and 440 to maximize the light transmitted to the next stage (e.g., next filter, or out of the architecture 500 in the case of splitter 445). One benefit of the architecture 500 is that the number of electrical control circuits is reduced, thereby reducing overall power consumption, according to some example embodiments.

Figure 6:
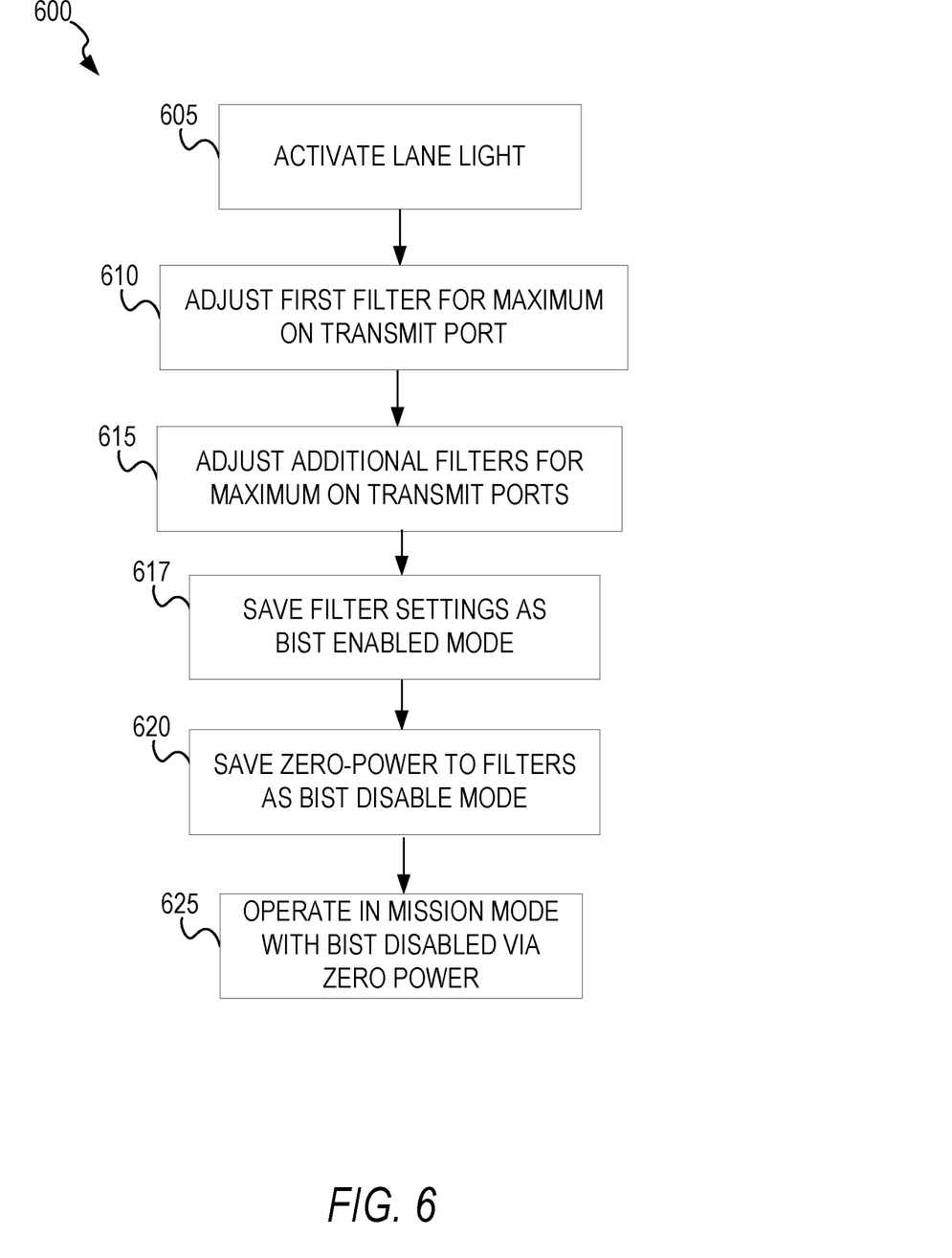
FIG. 6 shows a flow diagram of a method for tuning a built-in self-test switch, according to some example embodiments.

FIG. 6 shows a flow diagram of a method 600 for tuning a BIST switch, according to some example embodiments. At operation 605, a light source is activated. For example, at operation 605, a laser for one lane of a four PSM optical transceiver (e.g., laser 213) is activated to generate carrier light for modulation. In some example embodiments, the carrier light is used in unmodulated form for tuning each of the filters (e.g., filter 403, filter 423, and filter 437); while in some other embodiments, the light is modulated via an optical modulator during the tuning operations of method 600. In some example embodiments, the carrier light is activated and tuned to a target wavelength using a wafer top emitter 335.

At operation 610, the first filter is tuned to provide maximum transmission to the next stage. For example, at operation 610, the tuner 410 changes the phase of light on the lower arm such that light in the splitter 415 changes, from deconstructive interference at the output ports of splitter 415, to 95%-100% of the light being directed towards the transmit port via phase coupling with the light in the upper wavelength arm of filter 403. In some example embodiments, the tuner 410 is tuned by minimizing the power on a monitor photodiode at the drop port of the splitter 415 (monitor diode at drop ports not depicted in the above figures). In other example embodiments, the tuner 410 is tuned by maximizing the power on a tap and monitor photodiode connected to the transmit port of the power splitter 415 (e.g., the top port of the power splitter 415).

At operation 615, one or more additional filters are tuned to transmit a maximum light on the transmit port. For example, the tuner 425 is tuned to maximize the amount of light directed towards the transmit port of the splitter 430, which is then coupled to the next stage filter via splitter 435. Additionally, and in accordance with some example embodiments, at operation 615, the tuner 440 is electrically controlled to maximize the amount of light out of the output port (top port) of the splitter 445, where the default configuration of the splitter 445 (without tuning) passively attenuates the light (e.g., deconstructive interference, and/or directing a majority of the light towards the bottom port to an unguided mode or an optical absorber, such as a SOA in its off-mode to absorb/attenuate light). After each filter stage is optimized for maximum power to the transmit port, the filter setting are saved as BIST enabled mode at operation 617.

At operation 620, zero power is saved to the electrical controls of filters as BIST disabled mode. While in disabled mode, each of the splitters 415, 430, and 445 attenuates the light via deconstructive interference and/or directing the light received to the bottom port, which couples the light into an optical absorber or unguided mode, and not towards the loopback path (e.g., the aligned top ports).

At operation 625, the optical transceiver operates in mission mode with the BIST switch in its disabled configuration with zero power being provided to each of the switches, and the light being attenuated and/or diverted into the drop ports.

In some example embodiments, one or more operations for setting the filters is omitted. For example, in some example embodiments, operation 615 is omitted and the single electrical control circuit 505 is used to tune each of the tuners 410, 425, and 440 maximize the amount of light out of their respective transmit ports. In these example embodiments, the electrical control circuit 505 can vary the tuners simultaneously until the power at the lower drop port of splitter 445 is minimized according to an MPD at the drop port, after which point the control circuit 505 stores the tuned setting for BIST-enabled mode and returns to BIST-disabled mode by setting all the tuners simultaneously to zero power for passive high-attenuation.

In some example embodiments, the method 600 is performed N times for N amount of lanes, each comprising a zero-power BIST loopback structure 305 as discussed above. After the multiple BIST structures are tuned, each of the lanes can efficiently attenuate the loopback mode in a BIST-disabled mode with zero power setting at all the switches in each of the lanes.

Figure 7:
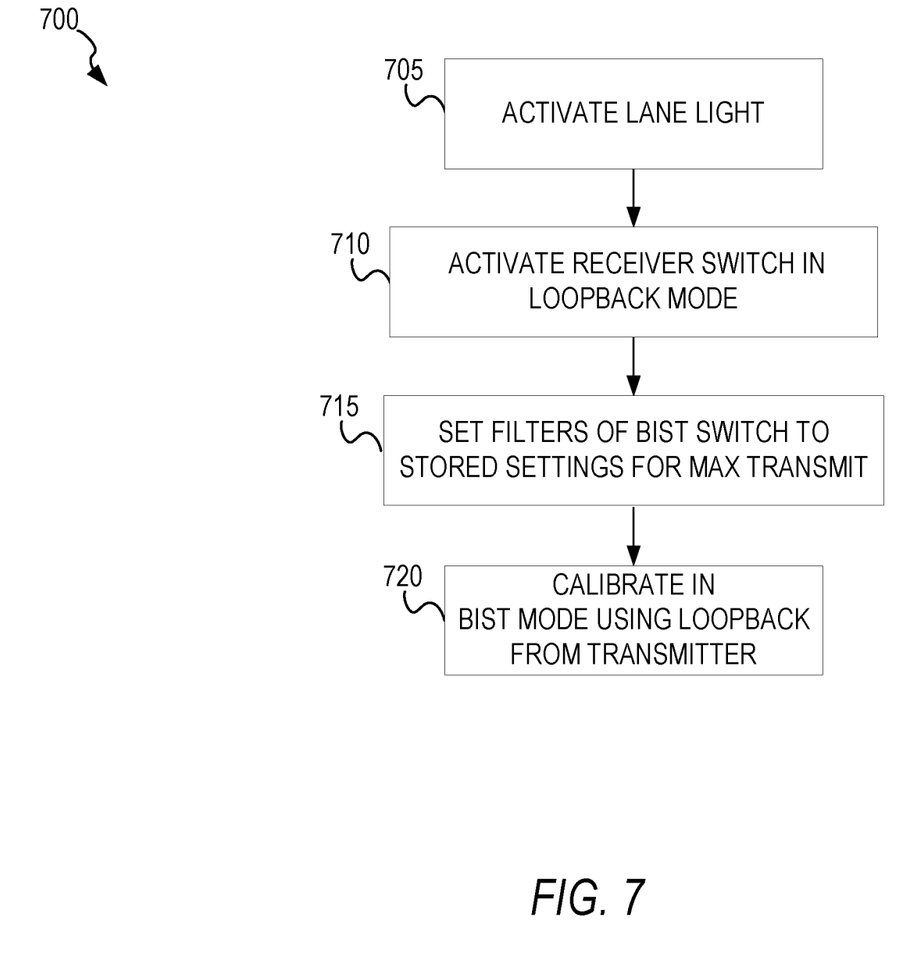
FIG. 7 shows a flow diagram of a method for enabling built-in self-test switch mode using a high lane count built-in self-test switch, according to some example embodiments.

FIG. 7 shows a flow diagram of a method 700 for enabling BIST mode using a high lane count BIST switch, according to some example embodiments. At operation 705, the light source is activated for the optical transceiver. At operation 710, the receiver switch is configured in loopback mode. For example, with reference to FIG. 3, the receiver switch 355 switches from the receiver input port (e.g., receiving from external sources, transmitters) to the BIST input port to receive light from the BIST switch 345.

At operation 715, the filters of the BIST switch are set to their tuned filter voltages that were stored at operations 610 and 615 of FIG. 6. During operations 715 and 720, the switches are in BIST-enabled mode and receive electrical power to couple light into each of the transmit ports of the filters 403, 423, and 437.

At operation 720, while in loopback mode with BIST switch power active, one or more optical components of the transceiver can be tested and calibrated. In some example embodiments, the method 700 is repeated for each lane of the optical transceiver (e.g., each lane of a 64 PSM optical transceiver). After each of the lanes is calibrated in BIST mode, all switches are set to zero power, thereby efficiently squelching the loopback path for each lane without consuming unnecessary power.

Figure 8:
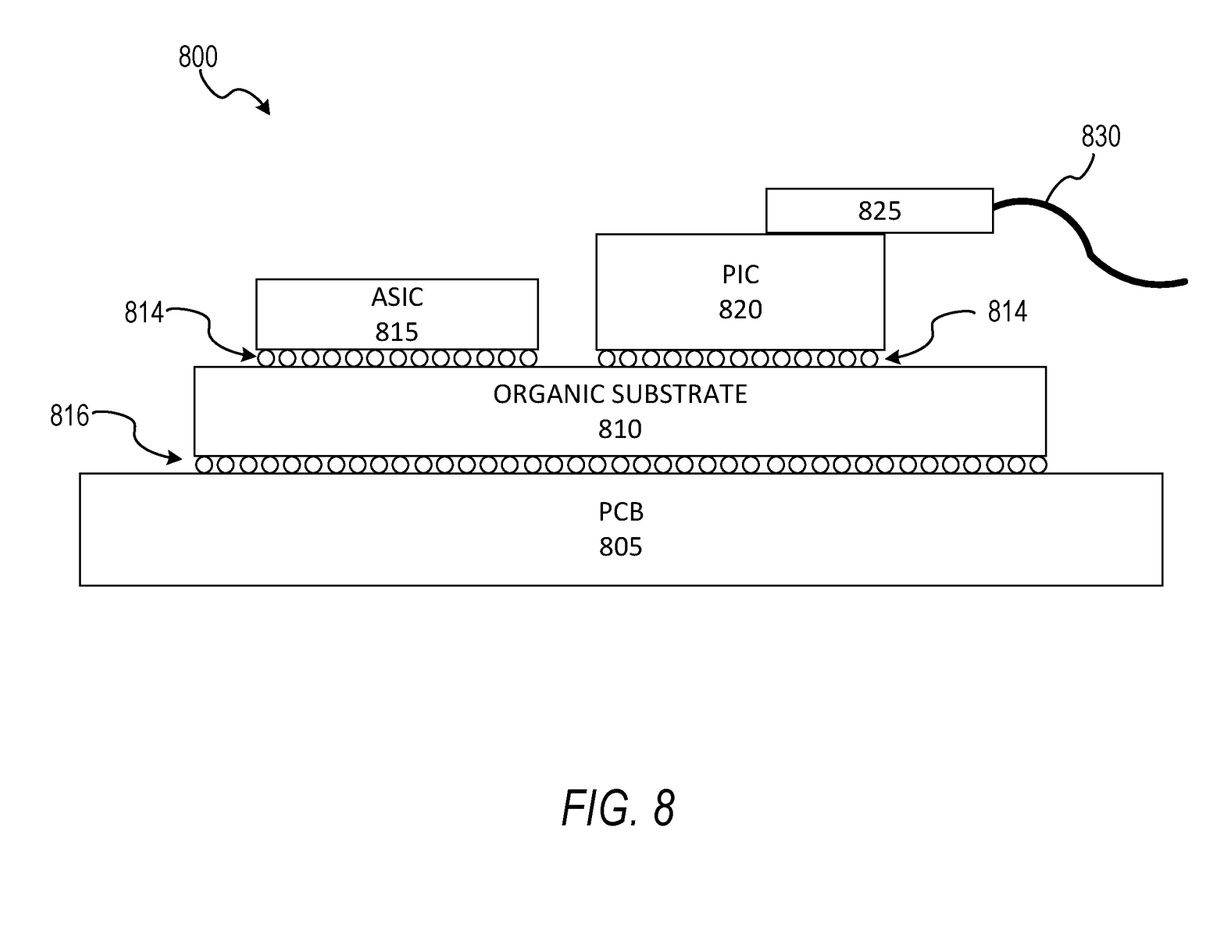
FIG. 8 is an illustration of an opto-electrical device including one or more optical devices according to some example embodiments.

FIG. 8 is an illustration of an opto-electrical device 800 (e.g., optical transceiver 100) including one or more optical devices according to some example embodiments. In this embodiment, the opto-electrical device 800 is shown to include printed circuit board (PCB) substrate 805, organic substrate 810, ASIC 815, and photonic integrated circuit (PIC) 820. In this embodiment, the PIC 820 may include one or more optical structures described above (e.g., PIC 110, a multilane PSM PIC having 64 lanes).

In some example embodiments, the PIC 820 includes silicon on insulator (SOI) or silicon-based (e.g., silicon nitride (SiN)) devices, or may comprise devices formed from both silicon and a non-silicon material. Said non-silicon material (alternatively referred to as "heterogeneous material") may comprise one of III-V material, magneto-optic material, or crystal substrate material. III-V semiconductors have elements that are found in group III and group V of the periodic table (e.g., Indium Gallium Arsenide Phosphide (InGaAsP), Gallium Indium Arsenide Nitride (GainAsN)). The carrier dispersion effects of III-V-based materials may be significantly higher than in silicon-based materials, as electron speed in III-V semiconductors is much faster than that in silicon. In addition, III-V materials have a direct bandgap which enables efficient creation of light from electrical pumping. Thus, III-V semiconductor materials enable photonic operations with an increased efficiency over silicon for both generating light and modulating the refractive index of light. Thus, III-V semiconductor materials enable photonic operation with an increased efficiency at generating light from electricity and converting light back into electricity.

The low optical loss and high quality oxides of silicon are thus combined with the electro-optic efficiency of III-V semiconductors in the heterogeneous optical devices described below; in embodiments of the disclosure, said heterogeneous devices utilize low loss heterogeneous optical waveguide transitions between the devices' heterogeneous and silicon-only waveguides.

Magneto-optic materials allow heterogeneous PICs to operate based on the magneto-optic (MO) effect. Such devices may utilize the Faraday Effect, in which the magnetic field associated with an electrical signal modulates an optical beam, offering high bandwidth modulation, and rotates the electric field of the optical mode enabling optical isolators. Said magneto-optic materials may comprise, for example, materials such as iron, cobalt, or yttrium iron garnet (YIG). Further, in some example embodiments, crystal substrate materials provide heterogeneous PICs with a high electro-mechanical coupling, linear electro optic coefficient, low transmission loss, and stable physical and chemical properties. Said crystal substrate materials may comprise, for example, lithium niobate (LiNbO3) or lithium tantalate (LiTaO3).

In the example illustrated, the PIC 820 exchanges light with fiber 830 via prism 825; said prism 825 is a misalignment-tolerant device used to couple an optical mode to a single-mode optical fiber, according to some example embodiments. In other example embodiments, multiple fibers are implemented to receive light from the prism 825 for various optical modulation formats (e.g., parallel single mode, with four lanes (PSM4)).

In some example embodiments, the optical devices of PIC 820 are controlled, at least in part, by control circuitry included in ASIC 815. Both ASIC 815 and PIC 820 are shown to be disposed on copper pillars 814, which are used for communicatively coupling the ICs via organic substrate 810. PCB substrate 805 is coupled to organic substrate 810 via ball grid array (BGA) interconnect 816, and may be used to interconnect the organic substrate 810 (and thus, ASIC 815 and PIC 820) to other components of system not shown—e.g., interconnection modules, power supplies, etc.

The following are example embodiments:

Example 1. A method for testing an optical transceiver comprising a transmitter and a receiver, the method comprising: transmitting light from the transmitter to the receiver along a loopback path in the optical transceiver in a loopback mode, the loopback mode being enabled by an integrated loopback switch comprising filters that switch from an inactive power mode to an active power mode to provide light along the loopback path; testing one or more optical components in the optical transceiver using light propagating along the loopback path in loopback mode;

setting the optical transceiver in mission mode by setting the integrated loopback switch from the active power mode to the inactive power mode, the filters of the integrated loopback switch configured to passively direct light away from the loopback path while in the inactive power mode; and transmitting, by the transmitter, output light while the optical transceiver is in mission mode and the filters of the integrated loopback switch are in the inactive power mode.

Example 2. The method of example 1, wherein the optical transceiver is a multilane optical transceiver comprising a plurality of transmitter and receiver pairs.

Example 3. The method of any of examples 1 or 2, wherein each transmitter and receiver pair is coupled by an individual loopback path down which light can be directed in the loopback mode using an individual integrated loopback switch that is operating in the active power mode.

Example 4. The method of any of examples 1-3, each individual integrated loopback switch comprising filters that switch from the inactive power mode that passively directs light away from the individual loopback path to the active power mode that actively directs light along the individual loopback path.

Example 5. The method of any of examples 1-4, wherein each filter in the integrated loopback switch comprises a power splitter that is configured to passively direct light away from the loopback path in the inactive power mode and actively direct light towards the loopback path in the active power mode.

Example 6. The method of any of examples 1-5, wherein the power splitter is a multimode coupler.

Example 7. The method of any of examples 1-6, wherein the power splitter is a direct coupler.

Example 8. The method of any of examples 1-7, wherein each power splitter in each filter comprises an electrically controlled tuner that changes a phase of light in the filter to direct light from a drop port of each filter to a transmit port of the filter.

Example 9. The method of any of examples 1-8, wherein the drop port of each filter transmits light away from the loopback path and wherein the transmit port of each filter transmits light towards the loopback path.

Example 10. The method of any of examples 1-9, wherein the filters are in a sequence to increasingly attenuate light in the inactive power mode by passively directing light received by each filter away from the loopback path to a drop port of the filter.

Example 11. The method of any of examples 1-10, further comprising: generating the light using a light source; and tuning the light source to a preconfigured wavelength using a wafer emitter in the integrated loopback switch.

Example 12. The method of any of examples 1-11, wherein the one or more optical components are tested in the loopback mode after tuning the light source to the preconfigured wavelength.

Example 13. The method of any of examples 1-12, wherein the light source is a tunable laser, and wherein the one or more optical components that are tested in the loopback mode include the light source.

Example 14. The method of any of examples 1-13, wherein an optical spectrum analyzer is coupled to the wafer emitter and wherein the light source is tuned to the preconfigured wavelength according to the light received by the optical spectrum analyzer from the wafer emitter of the integrated loopback switch.

Example 15. The method of any of examples 1-14, wherein the optical transceiver is included in a wafer, and the one or more optical components are tested using wafer-level testing using light emitted from the wafer emitter.

Example 16. An optical transceiver comprising: an optical transmitter configured to generate modulated light; an optical receiver to receive light; and an integrated loopback switch coupled to the optical transmitter and the optical receiver to couple light along a loopback path from the optical transceiver to the optical receiver, the integrated loopback switch comprising one or more filters that direct light along the loopback path from the optical transmitter to the optical receiver while in an active power mode and passively direct light away from the loopback path while in an inactive power mode.

Example 17. The optical transceiver of example 16, wherein each filter in the integrated loopback switch comprises a power splitter that is configured to passively direct the light away from the loopback path in the inactive power mode and actively direct the light towards the loopback path in the active power mode.

Example 18. The optical transceiver of any of examples 16 or 17, wherein in the inactive power mode the filters are in an off state and do not receive operating power.

Example 19. The optical transceiver of any of examples 16-18, wherein each power splitter in each filter comprises an electrically controlled tuner that changes a phase of light in the filter to direct light from a drop port to a transmit port of the filter to enable the loopback mode.

Example 20. The optical transceiver of any of examples 16-19, wherein the power splitter is an optical coupler with an uneven power splitting ratio.

In the foregoing detailed description, the method and apparatus of the present inventive subject matter have been described with reference to specific exemplary embodiments thereof. It will, however, be evident that various modifications and changes may be made thereto without departing from the broader spirit and scope of the present inventive subject matter. The present specification and figures are accordingly to be regarded as illustrative rather than restrictive.

What is claimed is:

1. A method for testing an optical transceiver comprising a transmitter and a receiver, the method comprising:
   transmitting light from the transmitter to the receiver along a loopback path in the optical transceiver in a loopback mode, the loopback mode being enabled by an integrated loopback switch comprising one or more filters that switch between an inactive power mode to an active power mode to provide light along the loopback path, each of the one or more filters comprising a power splitter that passively directs light away from the loopback path in the inactive power mode and actively directs light towards the loopback path in the active power mode;
   testing one or more optical components in the optical transceiver using light propagating along the loopback path in loopback mode;
   setting the optical transceiver in mission mode by setting the integrated loopback switch from the active power mode to the inactive power mode, the one or more filters of the integrated loopback switch configured to passively direct light away from the loopback path while in the inactive power mode; and
   transmitting, by the transmitter, output light while the optical transceiver is in the mission mode and the one or more filters of the integrated loopback switch are in the inactive power mode.

2. The method of claim 1, wherein the optical transceiver is a multilane optical transceiver comprising a plurality of transmitter and receiver pairs.

3. The method of claim 2, wherein each transmitter and receiver pair is coupled by an individual loopback path down which light can be directed in the loopback mode using an individual integrated loopback switch that is operating in the active power mode.

4. The method of claim 3, wherein each individual integrated loopback switch comprises one or more power splitters to passively direct light away from the individual loopback path in the inactive power mode and actively direct light along the individual loopback path in the active power mode.

5. The method of claim 1, wherein the power splitter is a multimode coupler.

6. The method of claim 1, wherein the power splitter is a direct coupler.

7. The method of claim 1, wherein the power splitter comprises an electrically controlled tuner that changes a phase of light to direct light to a transmit port of the power splitter.

8. The method of claim 7, wherein a drop port of the power splitter transmits light away from the loopback path and wherein the transmit port transmits light towards the loopback path.

9. The method of claim 1, wherein the one or more filters comprise a plurality of filters that are in a sequence to increasingly attenuate light in the inactive power mode by passively direct light away from the loopback path to drop ports of each of the plurality of filters.

10. The method of claim 1, further comprising:
generating the light using a light source; and
tuning the light source to a preconfigured wavelength using a wafer emitter in the integrated loopback switch.

11. The method of claim 10, wherein the one or more optical components are tested in the loopback mode after tuning the light source to the preconfigured wavelength.

12. The method of claim 10, wherein the light source is a tunable laser, and wherein the one or more optical components that are tested in the loopback mode include the light source.

13. The method of claim 10, wherein an optical spectrum analyzer is coupled to the wafer emitter and wherein the light source is tuned to the preconfigured wavelength according to the light received by the optical spectrum analyzer from the wafer emitter of the integrated loopback switch.

14. The method of claim 10, wherein the optical transceiver is included in a wafer, and the one or more optical components are tested using wafer-level testing using light emitted from the wafer emitter.

15. An optical transceiver comprising:
an optical transmitter configured to generate modulated light;
an optical receiver to receive light; and
an integrated loopback switch coupled to the optical transmitter and the optical receiver to couple light along a loopback path from the optical transmitter to the optical receiver, the integrated loopback switch comprising one or more filters, each of the one or more filters comprising a power splitter that passively directs light away from the loopback path in an inactive power mode and actively directs light towards the loopback path in an active power mode.

16. The optical transceiver of claim 15, wherein in the inactive power mode the one or more filters are in an off state and do not receive operating power.

17. The optical transceiver of claim 15, wherein the power splitter comprises an electrically controlled tuner that changes a phase of light to direct light from a drop port to a transmit port of the power splitter.

18. The optical transceiver of claim 15, wherein the power splitter has an even splitting ratio and deconstructive interference occurs in the power splitter in the inactive power mode.

19. The optical transceiver of claim 15, further comprising:
a light source to generate the light, wherein the light source is tunable to a preconfigured wavelength using a wafer emitter in the integrated loopback switch.

20. The optical transceiver of claim 19, wherein the optical transceiver is in a wafer, and one or more optical components in the optical transceiver are tested using wafer-level testing using light emitted from the wafer emitter.

* * * * *